(12) United States Patent
Aldana

(10) Patent No.: US 9,736,640 B2
(45) Date of Patent: Aug. 15, 2017

(54) METHODS AND SYSTEMS FOR A RANGING PROTOCOL

(71) Applicant: QUALCOMM Incorporated, San Diego, CA (US)

(72) Inventor: Carlos Horacio Aldana, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/832,900

(22) Filed: Aug. 21, 2015

(65) Prior Publication Data

US 2016/0249165 A1    Aug. 25, 2016

Related U.S. Application Data

(60) Provisional application No. 62/119,758, filed on Feb. 23, 2015.

(51) Int. Cl.

| | |
|---|---|
| *H04W 4/00* | (2009.01) |
| *H04W 4/02* | (2009.01) |
| *H04W 56/00* | (2009.01) |
| *H04L 27/26* | (2006.01) |
| *G01S 5/14* | (2006.01) |
| *H04W 64/00* | (2009.01) |
| *G01S 19/12* | (2010.01) |
| *G01S 13/76* | (2006.01) |

(52) U.S. Cl.
CPC ............ *H04W 4/023* (2013.01); *G01S 5/14* (2013.01); *G01S 13/765* (2013.01); *G01S 19/12* (2013.01); *H04L 27/2656* (2013.01); *H04L 27/2665* (2013.01); *H04W 56/0065* (2013.01); *H04W 64/00* (2013.01)

(58) Field of Classification Search
CPC combination set(s) only.
See application file for complete search history.

(56) References Cited

U.S. PATENT DOCUMENTS

| | | | |
|---|---|---|---|
| 8,711,820 B2* | 4/2014 | Grandhi | H04W 28/18 370/254 |
| 9,386,472 B2* | 7/2016 | Prechner | H04W 24/10 |
| 2013/0070644 A1 | 3/2013 | McCann et al. | |
| 2014/0187259 A1* | 7/2014 | Kakani | H04W 64/00 455/456.1 |
| 2014/0335885 A1* | 11/2014 | Steiner | H04W 64/00 455/456.1 |
| 2015/0341750 A1* | 11/2015 | Hayes | H04W 64/003 370/328 |

(Continued)

OTHER PUBLICATIONS

Aldana, Comment resolution to SB comments with CIDs 5174 and 5178, IEEE, 5 pages, May 2015.*

(Continued)

*Primary Examiner* — Frank Duong
(74) *Attorney, Agent, or Firm* — Berkeley Law & Technology Group, LLP

(57) ABSTRACT

Disclosed are methods and systems for obtaining measurements of a range between devices based on a Round Trip Time (RTT) for an exchange messages. In particular, described are techniques for sharing channel parameters between or among wireless transceiver devices to assist in initiating exchange of signals between neighboring wireless transceiver devices.

17 Claims, 11 Drawing Sheets

(56) References Cited

U.S. PATENT DOCUMENTS

2016/0044524 A1* 2/2016 Ben-Haim ............... G01S 5/14
370/252

OTHER PUBLICATIONS

Carlos Aldana: "Minor revisions to FTM, 11-15-1404-02-000m-minor-revisions-to-ftm", IEEE Draft, 11-15-1404-02—000m-minor-revisions-to-ftm, IEEE—SA Mentor, Piscataway, NJ USA, vol. 802.11m, No. 2, Nov. 12, 2015 (Nov. 12, 2015), pp. 1-27, XP068099393, [retrieved on Nov. 12, 2015] p. 17, paragraph 8.4.2.36-p. 24, paragraph 8.4.5.12.

Hart B., et al. "Location Related CIDs, 11-13-1509-02-000m-location-related-cids", IEEE Draft, 11-13-1509-02-000m-location-related-cids, IEEE—SA Mentor, Piscataway, NJ USA, vol. 802.11m, No. 2, Jan. 23, 2014 (Jan. 23, 2014), pp. 1-17, XP068063551, [ret.

Hart B., et al., "Location Related CIDs, 11-13-1509-06-000m-location-related-cids", IEEE Draft, 11-13-1509-06-000m-location-related-cids, IEEE—SA Mentor, Piscataway, NJ USA, vol. 802 . 11m, No. 6, Mar. 19, 2014 (Mar. 19, 2014), pp. 1-27, XP068068824, [retrieved on Mar. 19, 2014] the whole document.

Hart B., et al., "TPC, Operating Classes. and Channel Switching, 11-12-0297-00-00ac-tpc-operating-classes-and-channel-switching", IEEE Draft, 11-12-0297-00-00ac-tpc-operating-classes-and-channel-switching, IEEE—SA Mentor, Piscataway, NJ USA, vol. 802.11ac. Mar. 6, 2012 (Mar. 6, 2012), pp. 1-43, XP017672447, [retrieved on Mar. 6, 2012] p. 15.

International Search Report and Written Opinion—PCT/US2016/013763—ISA/EPO—Apr. 28, 2016.

* cited by examiner

| | Randomization Interval | Minimum AP Count | Neighbor Report Subelements | Optional Sub-elements |
|---|---|---|---|---|
| Octets: | 2 | 1 | variable | variable |

FIG. 6

| | Element ID | Length | BSSID | BSSID Information | Operating Class | Channel Number | PHY Type | Optional Subelements |
|---|---|---|---|---|---|---|---|---|
| Octets: | 1 | 1 | 6 | 4 | 1 | 1 | 1 | variable |

FIG. 7

| Subelement ID | Name | Extensible |
|---|---|---|
| 40 - 44 | Reserved | |
| 45 | HT Capabilities subelement | Yes |
| 46 - 60 | Reserved | |
| 61 | HT Operation subelement | Yes |
| 62 | Secondary Channel Offset subelement | |
| 63 - 65 | Reserved | |
| 66 | Measurement Pilot Transmission | Subelements |
| 67 - 69 | Reserved | |
| 70 | RM Enabled Capabilities | Yes |
| 71 | Multiple BSSID | Subelements |
| 72 - 190 | Reserved | |
| 191 | VHT Capabilities | Yes |
| 192 | VHT Operation | Yes |
| 193 - 200 | Reserved | |
| 221 | Vendor Specific | |
| 222 - 255 | Reserved | |

FIG. 8

| Element ID | Length | New Channel Width | New Channel Center Frequency Segment 0 | New Channel Center Frequency Segment 1 |
|---|---|---|---|---|
| 1 | 1 | 1 | 1 | 1 |

Octets:

FIG. 9

| Secondary Channel Offset (2 bits) | Reserved (4 bits) | New Channel Width (2 bits) |
|---|---|---|

FIG. 10

| Field | Definition | Encoding |
|---|---|---|
| Channel Width | This field, together with the HT Operation element STA Channel Width field, defines the BSS operating channel width (see 10.40.1 (Basic VHT BSS functionality)). | Set to 0 for 20 MHz or 40 MHz operating channel width. Set to 1 for 80 MHz operating channel width. Set to 2 for 160 MHz operating channel width. Set to 3 for non-contiguous 80+80 MHz operating channel width. Values in the range 4 to 255 are reserved. |
| Channel Center Frequency Segment 0 | Defines the channel center frequency for an 80 and 160 MHz VHT BSS and the frequency segment 0 channel center frequency for an 80+80 MHz VHT BSS. See 22.3.14 (Channelization) | For 80 MHz or 160 MHz operating channel width, indicates the channel center frequency index for the 80 MHz or 160 MHz channel on which the VHT BSS operates. For 80+80 MHz operating channel width, indicates the channel center frequency index for the 80 MHz channel of frequency segment 0 on which the VHT BSS operates. Reserved otherwise. |
| Channel Center Frequency Segment 1 | Defines the frequency segment 1 channel center frequency for an 80+80 MHz VHT BSS. See 22.3.14 (Channelization) | For an 80+80 MHz operating channel width, indicates the channel center frequency index of the 80 MHz channel of frequency segment 1 on which the VHT BSS operates. Reserved otherwise. |

FIG. 11

| HT Operation Element STA Channel Width field | VHT Operation element Channel Width field | BSS operating channel width |
|---|---|---|
| 0 | 0 | 20 MHz |
| 1 | 0 | 40 MHz |
| 1 | 1 | 80 MHz |
| 1 | 2 | 160 MHz |
| 1 | 3 | 80+80 MHz |

FIG. 12

METHODS AND SYSTEMS FOR A RANGING PROTOCOL

CROSS-REFERENCE TO RELATED APPLICATIONS

This application claims the benefit of U.S. Provisional Application No. 62/119,758, entitled "Methods and Systems for Ranging Protocol," filed Feb. 23, 2015, which is assigned to the assignee hereof and which is expressly incorporated herein by reference.

BACKGROUND

Field

Embodiments described herein are directed to obtaining measurements of signals acquired from a mobile transmitter.

Information

Satellite positioning systems (SPSs), such as the global positioning system (GPS), have enabled navigation services for mobile handsets in outdoor environments. Likewise, particular techniques for obtaining estimates of positions of mobile device in indoor environments may enable enhanced location based services in particular indoor venues such as residential, governmental or commercial venues. For example, a range between a mobile device and a transceiver positioned at fixed location may be measured based, at least in part, on a measurement of a round trip time (RTT) measured between transmission of a first message from a first device to a second device and receipt of a second message at the first device transmitted in response to the first message.

BRIEF DESCRIPTION OF THE DRAWINGS

Non-limiting and non-exhaustive aspects are described with reference to the following figures, wherein like reference numerals refer to like parts throughout the various figures unless otherwise specified.

FIGS. 6 through 10 are diagrams illustrating fields of a message transmitted from an assisting wireless transceiver device according to particular embodiments.

FIGS. 11 and 12 are tables with example values of parameters for a message transmitted from an assisting wireless transceiver device.

SUMMARY

Figure 1:
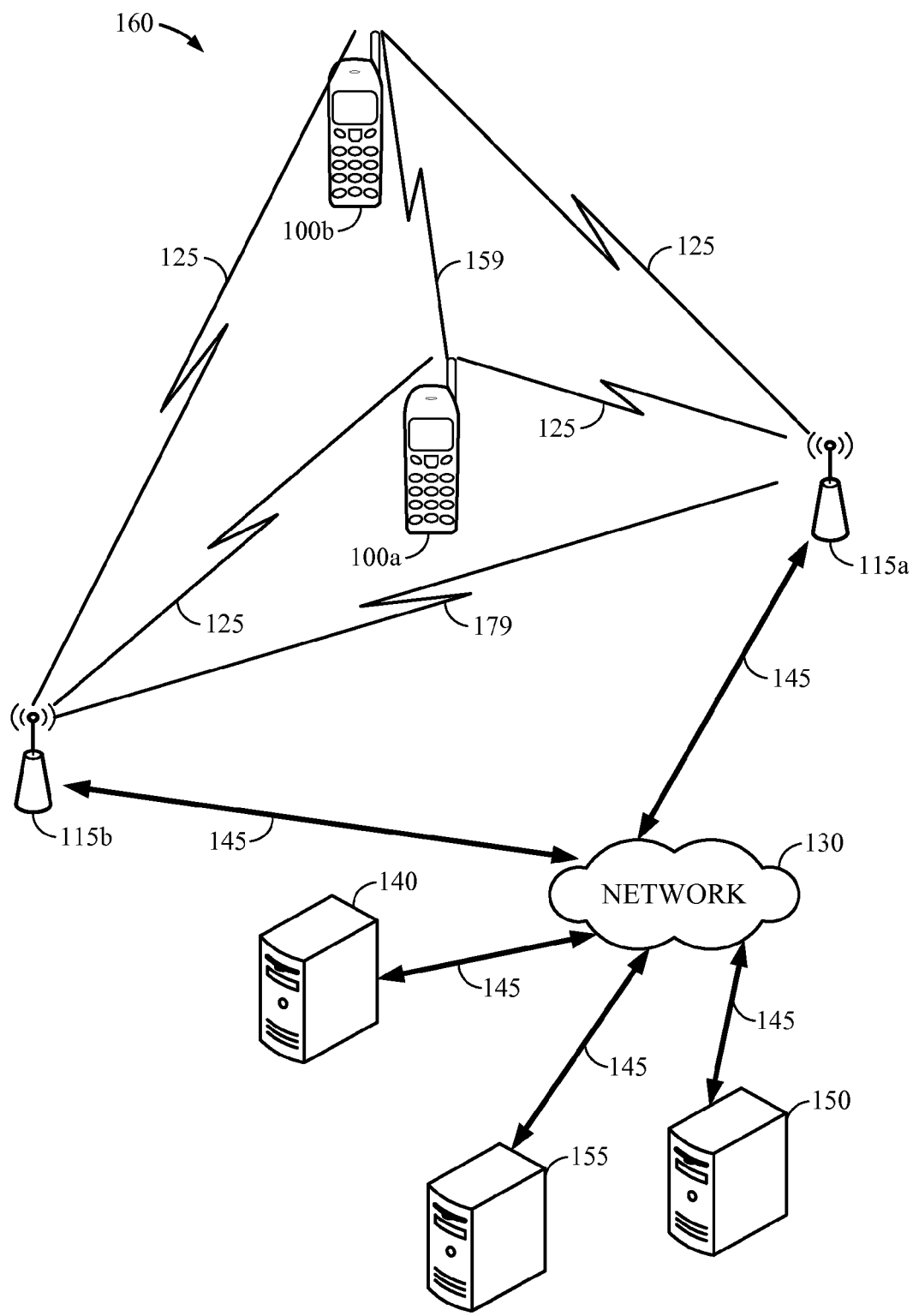
FIG. 1 is a system diagram illustrating certain features of a system containing a mobile device, in accordance with an implementation.

Briefly, particular implementations are directed to a method at an observing wireless transceiver device, a method comprising: receiving one or more messages from an assisting wireless transceiver device comprising one or more Neighbor Report Subelements fields, at least one of the Neighbor Report Subelements fields comprising a Wide bandwidth channel subelement of one or more neighboring wireless transceiver devices; and exchanging messages with the neighboring wireless transceiver devices based, at least in part, on one or more parameters in the Wide Bandwidth Channel subelement.

Another particular implementation is directed to an observing wireless transceiver device comprising: a receiver to receive messages from a wireless communication network; a transmitter to transmit messages to the wireless communication network; and one or more processors to: obtain one or more messages received at the receiver from an assisting wireless transceiver device comprising one or more Neighbor Report Subelements fields, at least one of the Neighbor Report Subelements fields comprising a Wide bandwidth channel subelement (WBCS) of one or more neighboring wireless transceiver devices; and initiate an exchange of messages through the transmitter with the neighboring wireless transceiver devices based, at least in part, on one or more parameters in the Wide Bandwidth Channel subelement.

Another particular implementation is directed to an observing wireless transceiver device comprising: means for receiving one or more messages from an assisting wireless transceiver device comprising one or more Neighbor Report Subelements fields, at least one of the Neighbor Report Subelements fields comprising a Wide bandwidth channel subelement specifying one or more parameters of one or more neighboring wireless transceiver devices; and means for exchanging messages with the neighboring wireless transceiver devices based, at least in part, on the one or more parameters.

Another particular implementation is directed to a non-transitory storage medium comprising machine-readable instructions stored thereon which are executable by one or more processors of an observing first wireless transceiver device to: obtain one or more messages received from an assisting wireless transceiver device comprising one or more Neighbor Report Subelements fields, at least one of the Neighbor Report Subelements fields comprising a Wide bandwidth channel subelement specifying one or more parameters of one or more neighboring wireless transceiver devices; and initiate an exchange of messages with the neighboring wireless transceiver devices based, at least in part, on the specified one or more parameters.

Another particular implementation is directed to a method, at an assisting wireless transceiver device, comprising: transmitting one or more messages to an observing wireless transceiver device comprising one or more Neighbor Report Subelements fields, at least one of the Neighbor Report Subelements fields comprising a Wide bandwidth channel subelement specifying one or more parameters of one or more neighboring wireless transceiver devices.

Another particular implementation is directed to an assisting wireless transceiver device comprising: a receiver to receive messages from a wireless communication network; a transmitter to transmit messages to the wireless communication network; and one or more processors to: initiate transmission of one or more messages through the transmitter to an observing wireless transceiver device comprising one or more Neighbor Report Subelements fields, at least one of the Neighbor Report Subelements fields comprising a Wide bandwidth channel subelement specifying one or more parameters of one or more neighboring wireless transceiver devices.

Another particular implementation is directed to an assisting wireless transceiver device comprising: means for receiving a first message from an observing wireless transceiver device; means for transmitting one or more second messages to the observing wireless transceiver device in response to receipt of the first message, the one or more second messages comprising one or more Neighbor Report Subelements fields, at least one of the Neighbor Report Subelements fields comprising a Wide Bandwidth Channel subelement specifying parameters of one or more neighboring wireless transceiver devices.

Another particular implementation is directed to a non-transitory storage medium comprising machine-readable instructions stored thereon which are executable by one or more processors of an assisting wireless transceiver device to: initiate transmission of one or more messages to an observing wireless transceiver device comprising one or more Neighbor Report Subelements fields, at least one of the Neighbor Report Subelements fields comprising a Wide bandwidth channel subelement specifying one or more parameters of one or more neighboring wireless transceiver devices.

It should be understood that the aforementioned implementations are merely example implementations, and that claimed subject matter is not necessarily limited to any particular aspect of these example implementations.

DETAILED DESCRIPTION

As discussed below, particular message flows may enable effective and efficient measurements of a range in connection with a transmission of messages between wireless stations (STAs). In a particular example, a STA may comprise any one of several types of transceiver devices such as, for example, a mobile user station (e.g., smartphone, notebook computer, tablet computer, etc.) or wireless service access device (e.g., wireless local area network (WLAN) access point, personal area network (PAN) or femto cell). Particular message flows and fields in message frames may enable obtaining round-trip time (RTT) or time of flight (TOF) measurements with sufficient accuracy for measuring a range between the wireless STAs using fewer messages, for example. Such a measured range may be used in any one of several applications including positioning operations, for example.

As discussed below, a first STA may transmit a fine timing measurement request message to a second STA to initiate a process for an exchange of messages or frames enabling the first STA to obtain an RTT or TOF measurement. In a particular implementation, the fine timing measurement request message may include an indication as to whether the first STA is capable of sharing ranging measurements or other parameters indicative of range. In a particular implementation, subsequent to computation of an RTT or TOF measurement, the first STA may transmit one or more messages to the second STA comprising a computed range, TOF or RTT measurement or other parameter indicative of range. It should be understood that this is merely an example implementation and that claimed subject matter is not limited in this respect.

Transmissions of messages between STAs for the measurement of RTT typically occurs in addition to other message traffic supporting other applications such as voice, video, HTTP, data, just to provide a few examples. Accordingly, in dense operating environments, messaging between STAs for the measurement of RTT may increase congestion and contention for wireless link resources. In particular implementations discussed below, particular positioning techniques may be supported by measuring a TOF for the transmission of a message between STAs using fewer messages than typical techniques used for measuring RTT. According to an embodiment, TOF may be measured for individual messages in a "burst" of messages transmitted close in a sequence. Combining multiple TOF measurements from a burst of received messages may enable reduction in measurement errors, for example.

According to an embodiment, as shown in FIG. 1, mobiles device 100a or 100b may transmit radio signals to, and receive radio signals from, a wireless communication network. In one example, a mobile device 100 may communicate with a communication network by transmitting wireless signals to, or receiving wireless signals from, a local transceiver 115 over a wireless communication link 125.

In a particular implementation, a local transceiver 115 may be positioned in an indoor environment. A local transceiver 115 may provide access to a wireless local area network (WLAN, e.g., IEEE Std. 802.11 network) or wireless personal area network (WPAN, e.g., Bluetooth network). In another example implementation, a local transceiver 115 may comprise a femto cell transceiver capable of facilitating communication on wireless communication link 125 according to a cellular communication protocol. Of course it should be understood that these are merely examples of networks that may communicate with a mobile device over a wireless link, and claimed subject matter is not limited in this respect.

In a particular implementation, local transceiver 115a or 115b may communicate with servers 140, 150 and/or 155 over a network 130 through links 145. Here, network 130 may comprise any combination of wired or wireless links. In a particular implementation, network 130 may comprise Internet Protocol (IP) infrastructure capable of facilitating communication between a mobile device 100 and servers 140, 150 or 155 through a local transceiver 115. In another implementation, network 130 may comprise wired or wireless communication network infrastructure to facilitate mobile cellular communication with mobile device 100.

In a particular implementation, mobile device 100 may be capable of computing a position fix based, at least in part, on signals acquired from local transmitters (e.g., WLAN access points positioned at known locations). For example, mobile devices may obtain a position fix by measuring ranges to three or more indoor terrestrial wireless access points which are positioned at known locations. Such ranges may be measured, for example, by obtaining a MAC ID address from signals received from such access points and obtaining range measurements to the access points by measuring one or more characteristics of signals received from such access points such as, for example, received signal strength (RSSI) or RTT. In alternative implementations, mobile device 100 may obtain an indoor position fix by applying characteristics of acquired signals to a radio heatmap indicating expected angle of arrival (AoA). In other alternative implementations, as pointed out above, mobile device 100 may obtain an indoor position fix by applying characteristics of acquired signals to a radio heatmap indicating expected TOF. Accordingly, a radio heatmap may comprising TOF, AoA, RSSI and/or RTT signatures at particular locations in an indoor area. In particular implementations, a radio heatmap may associate identities of local transmitters (e.g., a MAC address which is discernible from a signal acquired from a local transmitter), expected RSSI from signals transmitted by the identified local transmitters, an expected RTT from the identified transmitters, and possibly standard deviations from these expected AoA, TOF, RSSI or RTT. It should be understood, however, that these are merely examples of values that may be stored in a radio heatmap, and that claimed subject matter is not limited in this respect.

In particular implementations, a mobile device 100 or a local transceiver 115 may receive positioning assistance data for indoor positioning operations from servers 140, 150 or 155. For example, such positioning assistance data may include locations and identities of transmitters positioned at known locations to enable measuring ranges to these transmitters based, at least in part, on a measured RSSI and/or RTT, for example. Other positioning assistance data to aid indoor positioning operations may include radio heatmaps, magnetic heatmaps, locations and identities of transmitters, routeability graphs, just to name a few examples.

In a particular implementation, particular messages flows between wireless STAs may be implemented for obtaining a measurement of RTT from an exchange of messages between the STAs for use in positioning operations as discussed above. In particular implementations, as described below, any STA may comprise a mobile device (e.g., mobile device 100) or a stationary transceiver (e.g., IEEE std. 802.11 access point, stationary Bluetooth device, local transceiver 115, etc.). As such, an exchange of messages between wireless STAs may comprise an exchange of messages between a mobile device and a stationary transceiver (e.g., between a mobile device 100 and local transceiver 115 over a wireless link 125), between two peer mobile devices (e.g., between mobile devices 100*a* and 100*b* over wireless link 159), or between two stationary transceivers (e.g., between local transceiver 115*a* and local transceiver 115*b* over wireless link 179), just to provide a few examples. In particular implementations, various techniques described herein may incorporate some, but not necessarily all, aspects or features of IEEE P802.11-REVmc™/D4.0 Draft Standard 802.11 for Information technology—Telecommunications and information exchange between systems, Local and metropolitan area networks—Specific requirements Part 11: Wireless LAN Medium Access Control (MAC) and Physical Layer (PHY), January 2015, section 10.23.6 (hereinafter "IEEE std. 802.11"). Indeed, it should be understood that some features described herein are not shown, described or taught in the IEEE std. 802.11.

Figure 2:
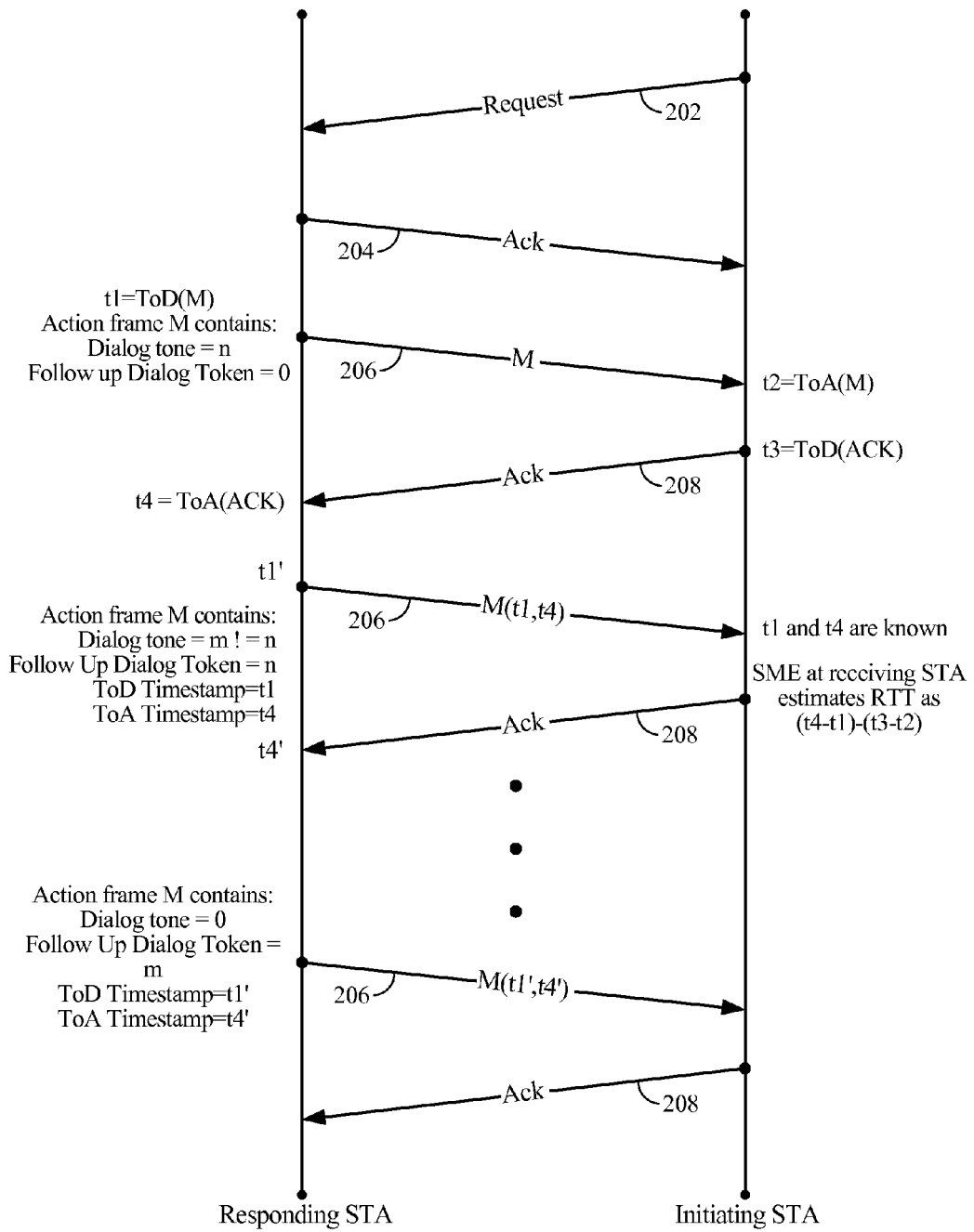
FIGS. 2 and 3 are message flow diagrams according to particular embodiments.

FIG. 2 is a diagram illustrating a message flow between wireless stations STAs including a "responding" STA and an "initiating" STA according to an embodiment. In this context, a responding STA or initiating STA may comprise any one of several transceiver devices including a mobile device (e.g., mobile device 100) or stationary access transceiver device (e.g., local transceiver 115). It should be understood, however, that these are merely examples of an initiating STA or a responding STA, and claimed subject matter is not limited in this respect. An initiating STA may obtain or compute one or more measurements of RTT based, at least in part, on timing of messages or frames transmitted between the initiating STA and a responding STA. As used herein, the terms "message" and "frame" are used interchangeably. The initiating STA may transmit a fine timing measurement request message or frame ("Request") 202 to the responding STA and receive a fine timing request message acknowledgement message or frame ("Ack") 204 transmitted in response. In a particular implementation, while not limiting claimed subject matter in this respect, contents of such a fine timing measurement request message 202 may be as shown in the IEEE std. 802.11 at section 8.6.8.32. In particular implementations, such an Ack frame 204 may merely provide an indication of receipt of a previously transmitted message. The initiating STA may then obtain or compute an RTT measurement based, at least in part, on time stamp values (t1, t4) provided in fine timing measurement messages or frames ("M") 206 received from the responding STA (and transmitted in response to receipt of a fine timing measurement request message). In a particular implementation, as shown in the message flow diagram, a sequence of multiple exchanges of alternating fine timing measurement messages 206 followed by fine timing measurement acknowledgement messages 208 may create additional time stamp values (t1, t2, t3 and t4).

According to an embodiment, a fine timing measurement (FTM) request message transmitted by an initiating STA may include fields, parameters, etc. characterizing a desired exchange of messages with a responding STA to provide fine timing measurements to the initiating STA enabling the initiating STA to compute an RTT measurement. In response to receipt of a FTM request message, a responding STA may transmit to the initiating STA one or more FTM messages including measurements or parameters enabling the initiating STA to compute RTT or other parameters indicative of range.

In a particular implementation, while not limiting claimed subject matter in this respect, contents of such a fine timing measurement message or frame may be as shown in the IEEE std. 802.11 at section 8.6.8.33. In one example implementation, an initiating STA may compute an RTT measurement as (t4−t1)−(t3−t2), where t2 and t3 are the time of receipt of a previous fine timing measurement message or frame and transmission of a preceding acknowledgement message or frame, respectively. The initiating STA may transmit a series of fine timing measurement request messages in a burst to obtain a corresponding number of RTT measurements which may be combined for cancellation of unbiased measurement noise in computing a range between the receiving and responding STAs.

FTM request messages and FTM messages may transmitted by STAs in addition to frames or messages for other services (e.g., for Internet Protocol messaging). In dense wireless traffic scenarios such as airport terminals or stadium events, transmission of FTM request messages and FTM messages for the computation of RTT may stress available messaging capacity at a STA. Particular implementations discussed herein may be directed to an exchange of messages for obtaining measurements for computation of range between STAs using the transmission of fewer messages by a STA.

An initiating STA and a responding STA may be synchronized to enable the initiating STA to accurately measure of a time of flight (TOF) of an FTM measurement message transmitted from the responding STTT to the initiating STA. In a particular implementation, the initiating STA and responding STA may maintain clock signals that are synchronized to one another. For example, the initiating and/or responding STA may be capable of converting between time as maintained at the initiating STA and time as maintained at the responding STA. Clocks maintained at the initiating and responding STAs may be synchronized using any of one of several techniques such as those provided or suggested by IEEE std. 802.11 REVmc Draft 4.0, section 10.24.5 or IEEE std. 802.11 REVmc Draft 4.0, section 10.24.6. It should be understood, however, that this is merely an example of techniques that may be applied in synchronizing an initiating STA with a responding STA, and claimed subject matter is not limited in this respect.

According to an embodiment, a TOF of a message wirelessly transmitted from a transmitting device and acquired at a receiving device may be measured if the transmitted message includes a time stamp value indicating a transmission time. In a particular implementation, the transmitted message may comprise fields (e.g., preamble, header and payload) containing encoded symbols that are detectable at the receiving device. To acquire the transmitted message and determine a time of arrival, the receiving device may detect or decode a particular symbol or symbols in a sequence of symbols being transmitted by the message. If the particular symbol is referenced to the time stamp value also included in the transmitted message, the receiving device may measure TOF=RTT/2 based on a different between the time stamp value and an instance that the particular symbol is decoded or detected.

Figure 3:
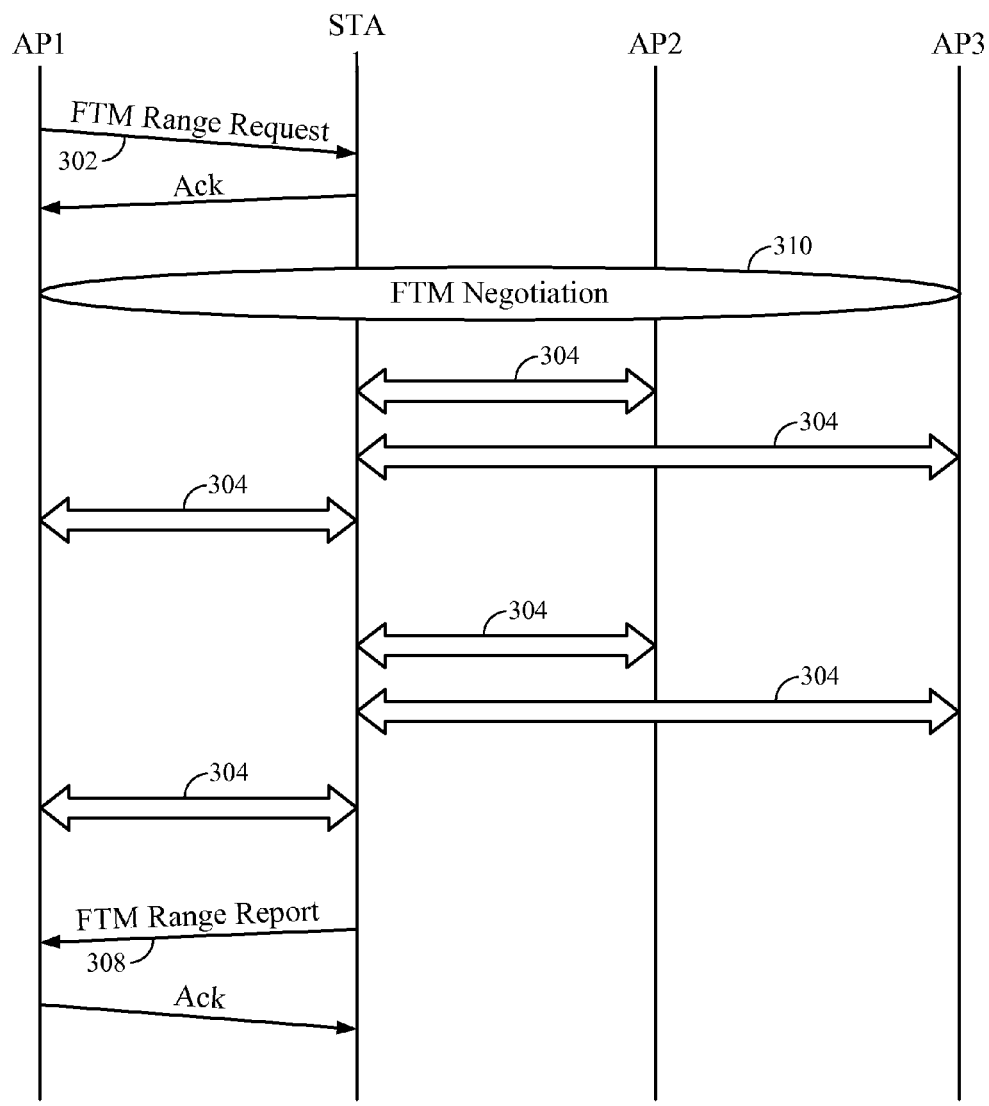

In particular network-centric positioning (NCP) techniques, an access point (AP) may request that a mobile device obtain measurements that may be used to compute a location of the mobile device. For example, an AP may transmit an FTM range request message to a mobile device to request that the mobile device obtain measurements based on messages exchanged with multiple devices (e.g., messages exchanged with the AP and other APs in operating in an area) as set forth in IEEE std. 802.11 section 10.11.9.11, for example. As illustrated in FIG. 3, an access point AP1 transmits an FTM range request message 302 to a mobile device STA1. In a particular implementation, FTM range report message 302 may be transmitted according to IEEE IEEE std. 8.4.2.20.19. Mobile device STA1 may then have one or more message exchanges 308 (e.g., FTM request messages and FTM messages) with access point AP1, access point AP2 and access point AP3 to obtain measurements such as, for example RTT or TOA, just to provide a couple of examples. Mobile device STA1 may then transmit an FTM range report message 308 including, for example, parameters indicative of ranges to access points AP1, AP2 or AP3, or any combination thereof (e.g., measured ranges, RTT measurements, TOA measurements or other measurements indicative of range) as set forth in IEEE std. 802.11 section 8.4.2.21.18.

In this context, mobile device ST1 provides a specific example of an "observing wireless transceiver device" in that mobile device ST1 comprises a wireless transceiver device that is capable of obtaining observations (e.g., messages, signals, etc.) that are indicative of a range to at least one other neighboring wireless transceiver device. It should be understood, however, that mobile device ST1 is merely an example of an observing wireless transceiver device, and that other types of wireless transceiver devices (e.g., stationary access points) may be used without deviating from claimed subject matter. Also, access point AP1 may provide a specific example of an "assisting wireless transceiver device" in that access point AP1 comprises a wireless transceiver device that is capable of transmitting messages to an observing wireless transceiver device comprising providing parameters, values, etc. that may be used by the observing wireless transceiver device in obtaining observations of neighboring wireless transceiver devices. It should be understood, however, that access point AP1 is merely an example of an assisting wireless transceiver device, and that other types of wireless transceiver devices (e.g., mobile devices) may be used without deviating from claimed subject matter.

According to an embodiment, FTM Range Request message 302 may provide parameters that may be used by mobile device STA1 in initiating or participating in one or more exchanges of messages 304 with neighboring wireless transceiver devices such as access points AP1, AP2 and AP3. Such an exchange of messages 304 may enable mobile device STA1 to obtain on or more measurements or observations indicative of ranges between mobile device STA1 and neighboring wireless transceiver devices such as, for example, measurements of RTT, TOF or range. In one example implementation, an exchange of messages 304 between mobile device STA1 and a neighboring wireless transceiver device may be executed as mobile device STA1 acting as an initiating STA and the neighboring wireless transceiver device acting as a responding STA as discussed above. In an alternative implementation, an exchange of messages 304 between mobile device STA1 and a neighboring wireless transceiver device may be executed as mobile device STA1 acting as a responding STA and the neighboring wireless transceiver device acting as an initiating STA as discussed above. In an example embodiment, a negotiation 310 between mobile device STA1 and neighboring wireless transceiver device may enable determination of roles as initiating STA and responding STA for subsequent exchanges of messages 304. Here, in this particular example implementation, mobile device STA1 may act as an initiating while access points AP1, AP2 and AP3 may perform as responding STAs with respect to mobile device STA1.

Figure 4:
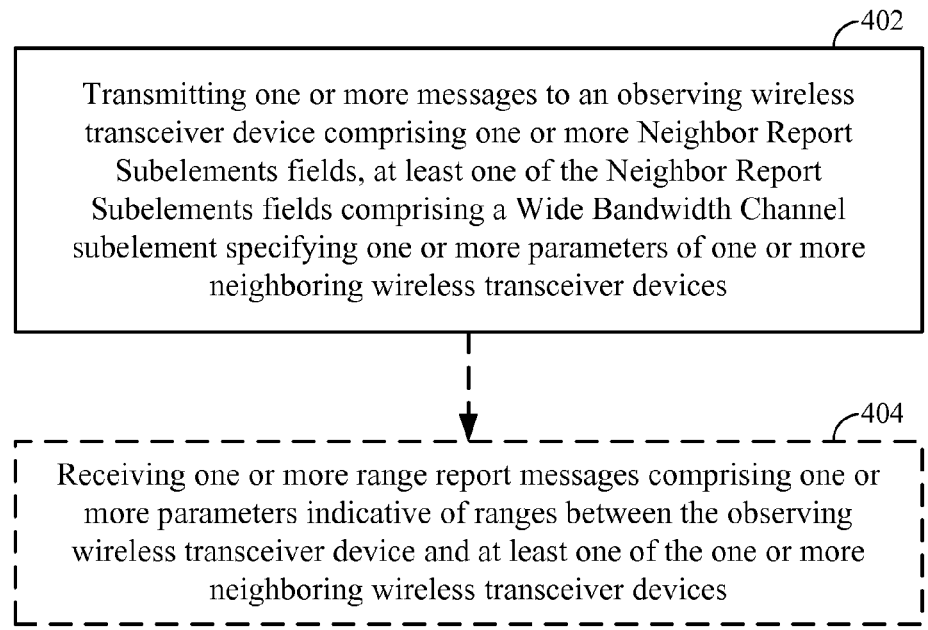
FIGS. 4 and 5 are flow diagrams of processes according to particular embodiments.
Figure 5:
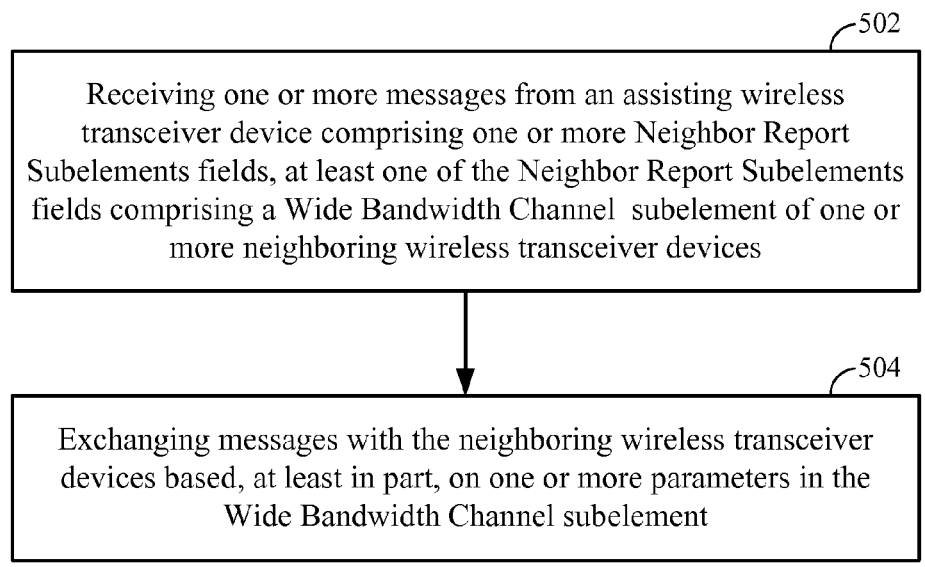

FIG. 4 illustrates a process that may be performed at an assisting wireless transceiver device such as access point AP1 shown in FIG. 3. At block 402, one or more messages such as an FTM range request message may be transmitted to an observing wireless transceiver device such as mobile device STA1. FIG. 5 illustrates a complementary process that may be performed at an observing wireless transceiver device such as mobile device STA1 shown in FIG. 3. At block 502, an observing wireless transceiver device such as mobile device STA1 may receive one or more messages from an assisting wireless transceiver device such as access point AP1 such as an FTM range request message. At block 504, the observing wireless transceiver device may exchange messages with one or more neighboring wireless transceiver devices based, at least in part, on one or more parameters in the one or more messages received at block 502 as discussed above. For example, the observing wireless transceiver device may transmit FTM request messages to neighboring wireless transceiver devices on a channel based on a Wide Bandwidth Channel subelement in one or more messages received at block 502. This may avoid any need for the observing wireless transceiver device to scan for a channel on which to transmit a FTM request message, for example. Based on exchanges of messages with the one or more neighboring wireless transceiver devices, the observing wireless transceiver device may obtain observations or parameters indicative of ranges to the neighboring wireless transceiver devices. In an optional implementation, these observations or parameters indicative of ranges to the neighboring wireless transceiver devices may be reported back to the assisting wireless transceiver device in one or more report messages received at block 404.

In the particular implementation of FIG. 3, an FTM range request message (e.g., transmitted at block 402) from access point AP1 acting as an assisting wireless transceiver device may indicate particular neighboring wireless transceiver devices (e.g., AP2 and AP3) with which mobile device STA1 may exchange messages for obtaining observations or measurements. FIG. 6 shows fields of a message transmitted from an assisting wireless transceiver device according to a particular implementation including a "Neighbor Report Subelements" field and an "Optional Subelements" field. Here, multiple Neighbor Report Subelements fields may specify or characterize particular neighboring wireless transceiver devices with which a recipient observing wireless transceiver device may exchange messages for obtaining observations or measurements. FIG. 7 shows fields of a Neighbor Report Subelement field which includes fields such as BSSID, BSSID Information and Channel Number to indicate an identity of a corresponding neighboring wireless transceiver device and frequency channel on which the corresponding neighboring wireless transceiver device is currently operating.

The particular implementation of FIG. 7 further shows that a Neighbor Report Subelement field for a corresponding neighboring wireless transceiver device may include an appended "Optional Subelements" field. Fields within an Optional Subelements field may include particular subelements shown in FIG. 8. In one particular implementation of particular subelements shown in FIG. 8, a subelement ID 193 may comprise a Wide Bandwidth Channel subelement as shown in FIG. 9 to include parameters characterizing current channel operation characteristics of a neighboring wireless transceiver device such as high throughput (HT) or very high throughput (VHT) parameters. Examples of values to specify HT or VHT parameters in Channel Width, and Channel Center Frequency for segments 0 and 1 are shown in the Tables of FIGS. 11 and 12, for example.

While the processes of FIGS. 4 and 5 make specific reference to use of Neighbor Report subelements as a specific implementation for the purposes of illustration, it should be understood that similar parameters, indications, etc. may be similarly provided or transmitted in a message to an observing wireless transceiver device using different fields in a message. Additionally, while specific use of a Wide Bandwidth Channel subelement is described for a particular embodiment, it should be understood that different parameters in a field may be used without deviating from claimed subject matter. In other example implementations, other parameters characterizing current operation of a neighboring wireless transceiver devices. For example, alternative parameters or fields other than a Wide Bandwidth Channel subelement may be used to convey parameters charactering current channel operation of a neighboring wireless transceiver device (e.g., Channel Width, and Channel Center Frequency for segments 0 and 1 shown in the Tables of FIGS. 11 and 12) without deviating from claimed subject matter. Here, these to enable acquisition with minimal or no scanning. Receiving these alternative parameters or fields characterizing current channel operation of a neighboring wireless transceiver device, an observing wireless transceiver device may initiate a message, a wireless transceiver device may initiate a session to exchange messages (e.g., for ranging) with reduced or eliminated scanning.

In a particular implementation, bits within a New Channel Width field of the Wide Bandwidth Channel subelement of FIG. 9 may be formatted according to the particular implementation of FIG. 10. As shown, an initial two bits may specify a secondary channel offset, followed by four reserved bits, which are followed by two bits specifying a New Channel Width. Here, two bits specifying a secondary channel offset may indicate a frequency offset of a secondary channel relative to a center frequency of a primary channel. Here, for a channel bandwidth of 80 MHz or higher, a center frequency of a primary 80 or 160 MHz segment and secondary 80 MHz segment in the 80+80 case may be specified in the aforementioned Channel Center Frequency for segments 0 and 1 fields of a Wide Bandwidth Channel subelement, respectively. In a particular implementation, the two bits specifying a secondary channel offset may specify that an offset of a center frequency of a secondary channel relative to a center frequency of a primary channel is above (e.g., higher than) the center frequency of the primary channel if the secondary channel offset field is set to one. Similarly, a value of three for the two bits specifying a secondary channel offset may specify that the center frequency of the secondary channel is below (e.g., lower than) the center frequency of the primary channel. A value of zero for the two bits specifying a secondary offset may indicate that no secondary channel is present. Particular non-limiting examples of encoding operational channel characteristics are summarized in FIGS. 11 and 12.

Specifying HT or VHT parameters using a Wide Bandwidth Channel subelement in a Neighbor Report Subelement for neighboring wireless transceiver devices as discussed above may avoid any need of an observing wireless transceiver device to obtain these parameters by sending probe requests or acquisition of beacon signals. This may enable reduced power consumption and reduced time for performing ranging operations. For example, this may avoid transmission of probe signals or acquisition of beacon signals before FTM negotiation 310 or message or frame exchanges 304.

Figure 13:
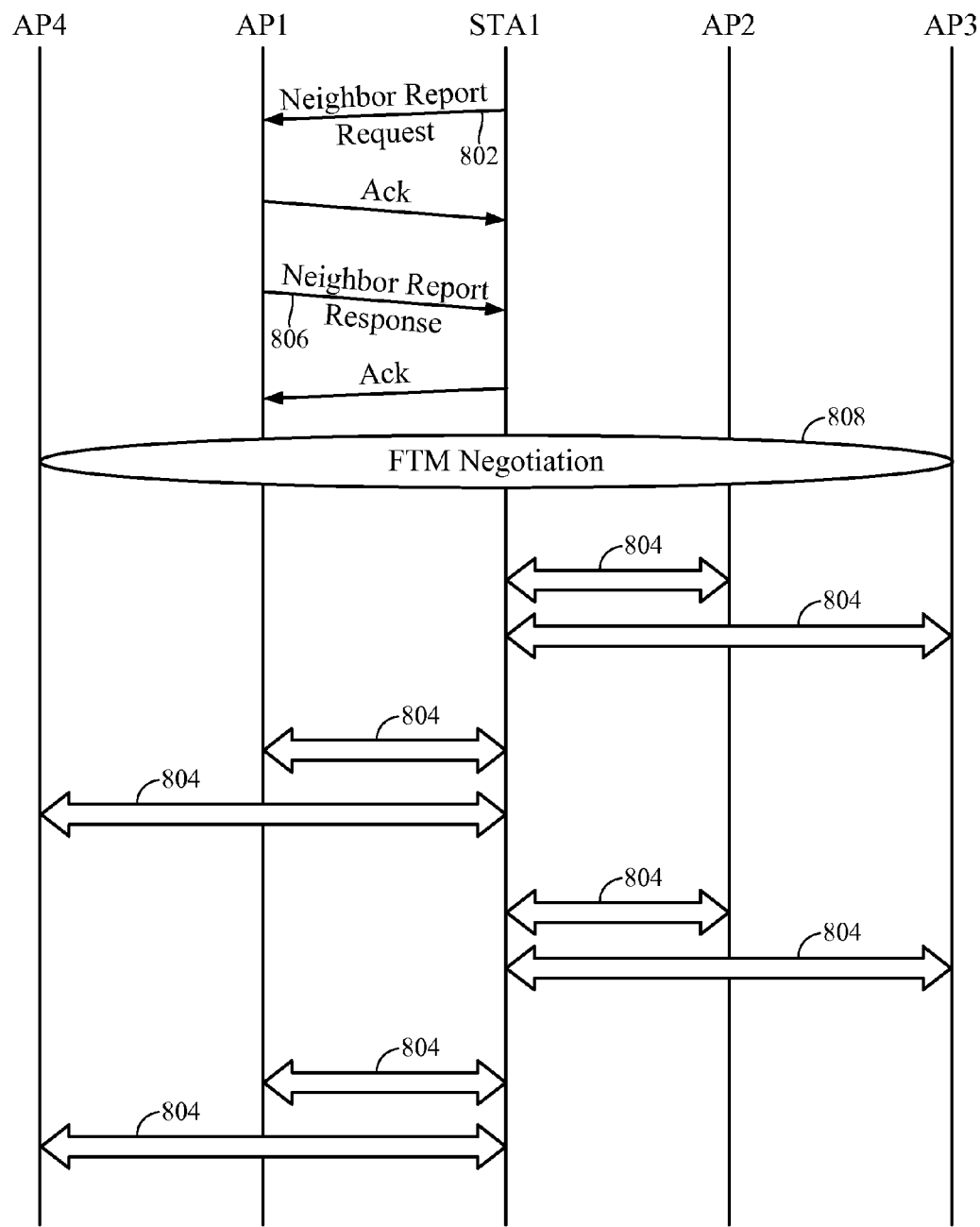
FIGS. 13 and 14 are message flow diagrams according to alternative implementations.

While the particular examples of specifying HT or VHT parameters in a Neighbor Report Subelement are applicable to an FTM range request message 302 as shown in FIG. 3, a Wide Bandwidth Channel subelement as described above may be implemented in other similar messages. In the particular implementation of FIG. 13, mobile device ST1 (e.g., acting as an observing wireless transceiver device) may transmit a Neighbor Report Request message 802 to access point AP1 (e.g., acting as an assisting wireless transceiver device) according to IEEE std. 802.11k. Here, in response to Neighbor Report Request message 802 access point AP1 may transmit a Neighbor Report message 804. Here, Neighbor Report Response message 806 may include one or more Neighbor Report Subelements including one or more WBCS elements as described above. This may enable mobile device ST1 to initiate exchanges of messages or frames 804 with neighboring wireless transceiver devices (e.g., access points AP1, AP2, AP3 and AP4) for obtaining ranging parameters as discussed above. For example, mobile device may act as an initiating STA or a responding STA to obtain measurements or observations indicative of range in exchanges of messages or frames 804.

Figure 14:
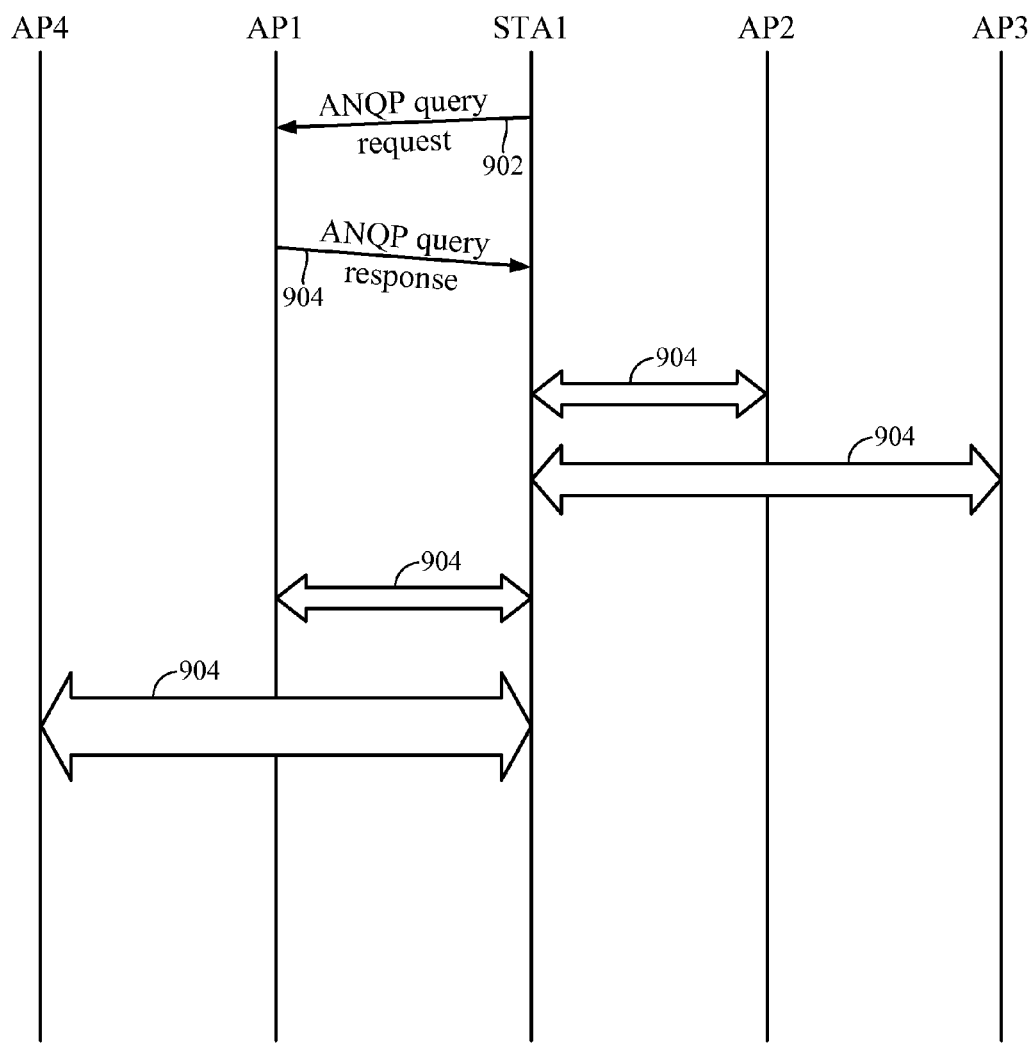

In another example implementation illustrated in FIG. 14, mobile device STA1 may interact as a client with access point AP1 according to an Access Network Query Protocol (ANQP) under IEEE std. 802.11u. In a particular implementation, ANQP may enable access point AP1 (e.g., acting as an assisting wireless transceiver device) to provide metadata to mobile device (e.g., acting as an observing wireless transceiver device) for use by mobile device STA1 in selecting an access point. Here, mobile device STA1 may transmit an ANQP query request message 902. Access point AP1 may transmit an ANQP query response message 904 including, among other things, an AP operator's domain name, Internet Protocol (IP) addresses available at access point AP1, and information about potential roaming partners accessible through access point AP1. In addition, in a particular implementation, ANQP query response message 904 may include one or more Neighbor Report Subelements including one or more WBCS elements as described above. This may enable mobile device ST1 to initiate exchanges of messages or frames 904 with neighboring wireless transceiver devices (e.g., access points AP1, AP2, AP3 and AP4) for obtaining ranging parameters as discussed above. For example, mobile device may act as an initiating STA or a responding STA to obtain measurements or observations indicative of range in exchanges of messages or frames 904.

Figure 15:
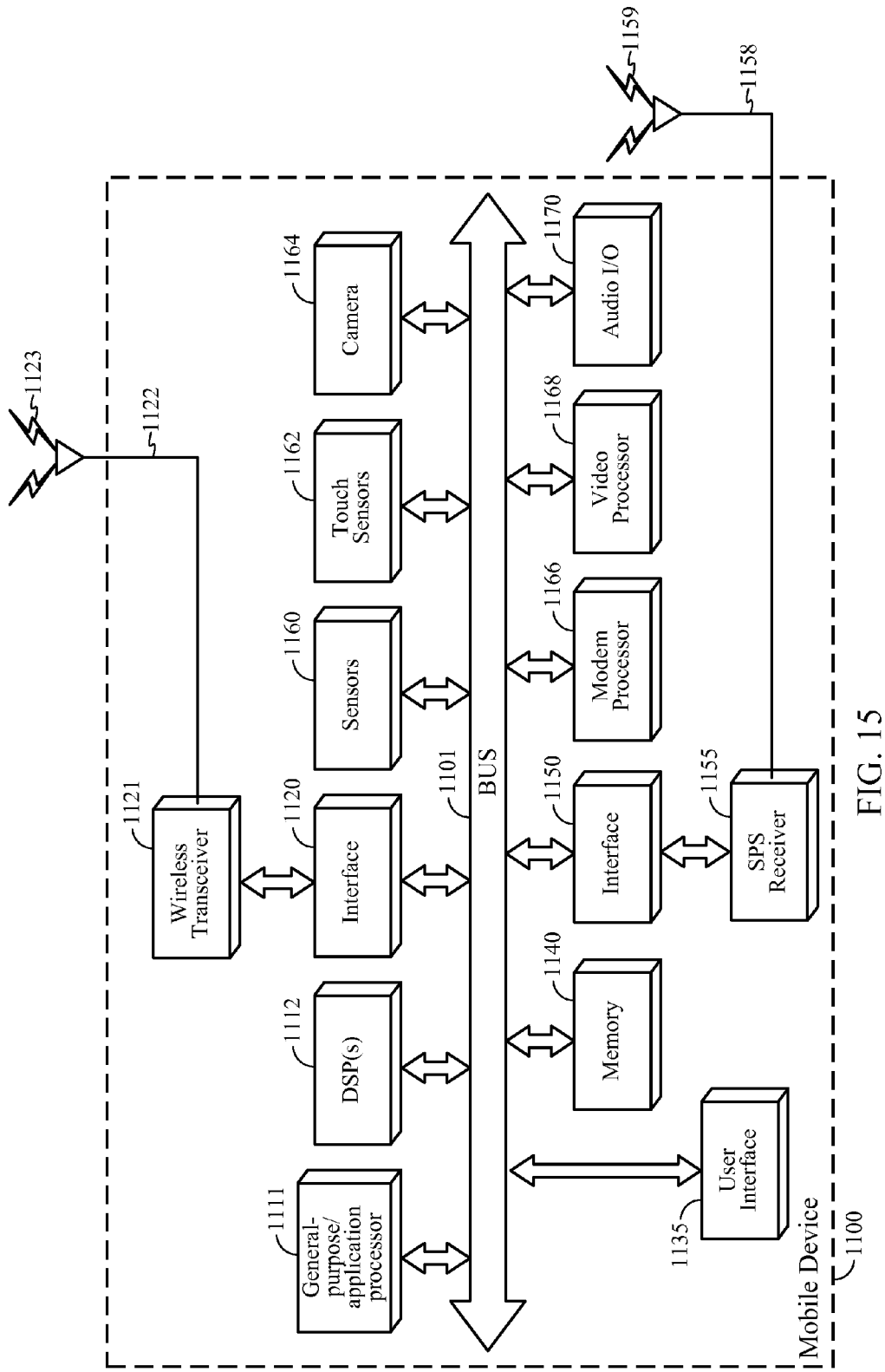
FIG. 15 is a schematic block diagram illustrating an exemplary device, in accordance with an implementation.

FIG. 15 is a schematic diagram of a mobile device according to an embodiment. Mobile device 100 (FIG. 1) may comprise one or more features of mobile device 1100 shown in FIG. 15. In certain embodiments, mobile device 1100 may also comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE Std. 802.11, CDMA, WCD-MA, LTE, UMTS, GSM, AMPS, Zigbee and Bluetooth, just to name a few examples.

Mobile device 1100 may also comprise SPS receiver 1155 capable of receiving and acquiring SPS signals 1159 via SPS antenna 1158. SPS receiver 1155 may also process, in whole or in part, acquired SPS signals 1159 for estimating a location of mobile device 1000. In some embodiments, general-purpose processor(s) 1111, memory 1140, DSP(s) 1112 and/or specialized processors (not shown) may also be utilized to process acquired SPS signals, in whole or in part, and/or calculate an estimated location of mobile device 1100, in conjunction with SPS receiver 1155. Storage of SPS or other signals for use in performing positioning operations may be performed in memory 1140 or registers (not shown).

Also shown in FIG. 15, mobile device 1100 may comprise digital signal processor(s) (DSP(s)) 1112 connected to the bus 1101 by a bus interface 1110, general-purpose processor(s) 1111 connected to the bus 1101 by a bus interface 1110 and memory 1140. Bus interface 1110 may be integrated with the DSP(s) 1112, general-purpose processor(s) 1111 and memory 1140. In various embodiments, functions may be performed in response execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. In a particular implementation, wireless transceiver 1121 may communicate with general-purpose processor(s) 1111 and/or DSP(s) 1112 through bus 1101 to enable mobile device 1100 to be configured as a wireless STA as discussed above. General-purpose processor(s) 1111 and/or DSP(s) 1112 may execute instructions to execute one or more aspects of processes discussed above in connection with FIGS. 4 and 5.

In one particular implementation, transmission of an ACK message in response to a FTM measurement request message may be performed by wireless transceiver device 1121 without instruction or initiation from general-purpose processor(s) 1111 or DSP(s) 1112. On the other hand, an FTM range report message may be formed at a programmable device such as general-purpose processor(s) 1111 and/or DSP(s) 1112 (e.g., from execution of one or more machine-readable instructions stored in memory 1140).

Also shown in FIG. 15, a user interface 1135 may comprise any one of several devices such as, for example, a speaker, microphone, display device, vibration device, keyboard, touch screen, just to name a few examples. In a particular implementation, user interface 1135 may enable a user to interact with one or more applications hosted on mobile device 1100. For example, devices of user interface 1135 may store analog or digital signals on memory 1140 to be further processed by DSP(s) 1112 or general purpose/application processor 1111 in response to action from a user. Similarly, applications hosted on mobile device 1100 may store analog or digital signals on memory 1140 to present an output signal to a user. In another implementation, mobile device 1100 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 1100 may comprise touch sensors 1162 responsive to touching or pressure on a keyboard or touch screen device.

Mobile device 1100 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on mobile device 1100.

Mobile device 1100 may also comprise sensors 1160 coupled to bus 1101 which may include, for example, inertial sensors and environment sensors. Inertial sensors of sensors 1160 may comprise, for example accelerometers (e.g., collectively responding to acceleration of mobile device 1100 in three dimensions), one or more gyro-scopes or one or more magnetometers (e.g., to support one or more compass applications). Environment sensors of mobile device 1100 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) or general purpose/application processor 1111 in support of one or more applications such as, for example, applications directed to positioning or navigation operations.

In a particular implementation, mobile device 1100 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be up-converted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 16:
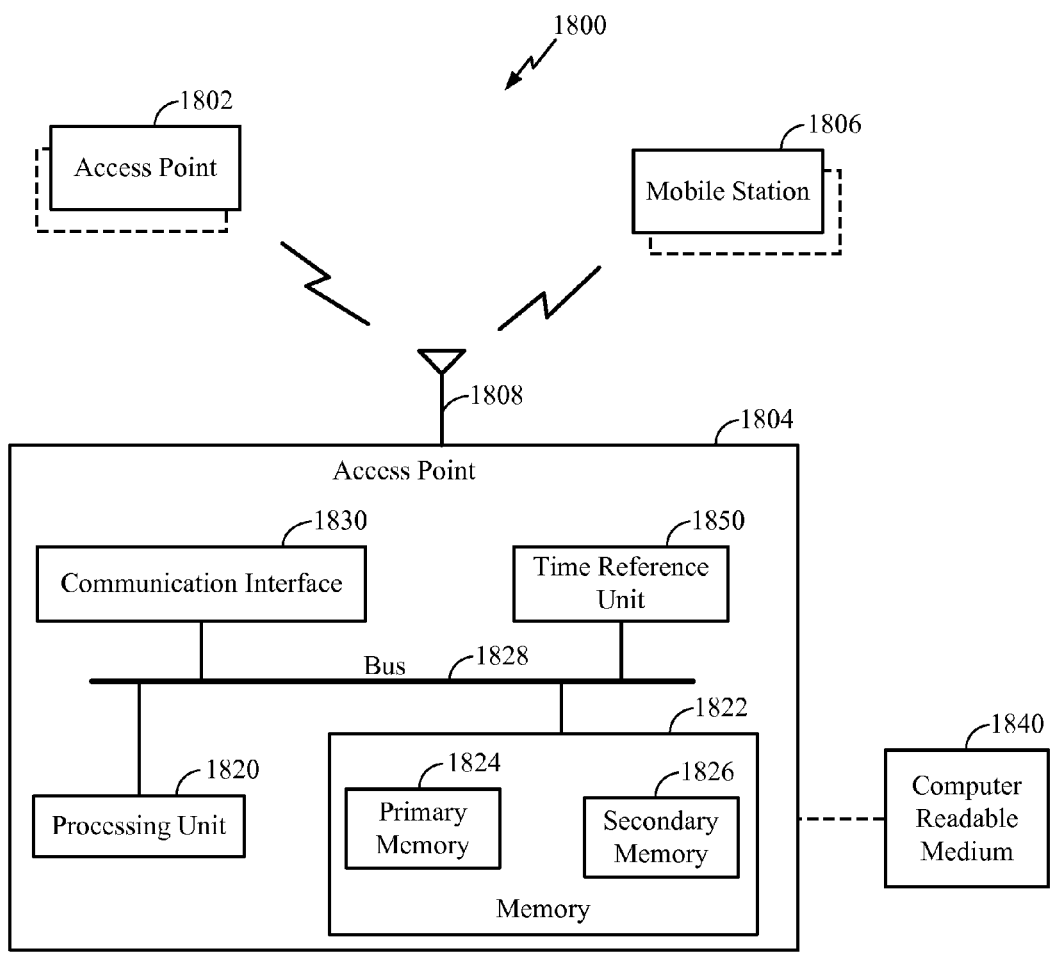
FIG. 16 is a schematic block diagram of an example computing system in accordance with an implementation.

FIG. 16 is a schematic diagram illustrating an example system 1800 that may include one or more devices configurable to implement techniques or processes described above, for example, in connection with FIG. 1. System 1800 may include, for example, a first device 1802, a second device 1804, and a third device 1806, which may be operatively coupled together through a wireless communications network. In an aspect, first device 1802 may comprise an access point as shown, for example. Second device 1804 may comprise an access point (e.g., local transceiver 115 or base station transceiver 110) and third device 1806 may comprise a mobile station or mobile device, in an aspect. Also, in an aspect, devices 1802, 1804 and 1802 may be included in a wireless communications network may comprise one or more wireless access points, for example. However, claimed subject matter is not limited in scope in these respects.

First device 1802, second device 1804 and third device 1806, as shown in FIG. 16, may be representative of any device, appliance or machine that may be configurable to exchange data over a wireless communications network. By way of example but not limitation, any of first device 1802, second device 1804, or third device 1806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1802, 1804, and 1806, respectively, may comprise one or more of an access point or a mobile device in accordance with the examples described herein.

Similarly, a wireless communications network, as shown in FIG. 16, is representative of one or more communication links, processes, or resources configurable to support the exchange of data between at least two of first device 1802, second device 1804, and third device 1806. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1806, there may be additional like devices operatively coupled to wireless communications network 1808.

It is recognized that all or part of the various devices and networks shown in FIG. 16, and the processes and methods as further described herein, may be implemented using or otherwise including hardware, firmware, software, or any combination thereof.

Thus, by way of example but not limitation, second device 1804 may include at least one processing unit 1820 that is operatively coupled to a memory 1822 through a bus 1828.

Processing unit 1820 is representative of one or more circuits configurable to perform at least a portion of a data computing procedure or process. By way of example but not limitation, processing unit 1820 may include one or more processors, controllers, microprocessors, microcontrollers, application specific integrated circuits, digital signal processors, programmable logic devices, field programmable gate arrays, and the like, or any combination thereof.

Memory 1822 is representative of any data storage mechanism. Memory 1822 may include, for example, a primary memory 1824 or a secondary memory 1826. Primary memory 1824 may include, for example, a random access memory, read only memory, etc. While illustrated in this example as being separate from processing unit 1820, it should be understood that all or part of primary memory 1824 may be provided within or otherwise co-located/coupled with processing unit 1820. In a particular implementation, memory 1822 and processing unit 1820 may be configured to execute one or more aspects of process discussed above in connection with FIGS. 4 and 5.

Secondary memory 1826 may include, for example, the same or similar type of memory as primary memory or one or more data storage devices or systems, such as, for example, a disk drive, an optical disc drive, a tape drive, a solid state memory drive, etc. In certain implementations, secondary memory 1826 may be operatively receptive of, or otherwise configurable to couple to, a computer-readable medium 1840. Computer-readable medium 1840 may include, for example, any non-transitory medium that can carry or make accessible data, code or instructions for one or more of the devices in system 1800. Computer-readable medium 1840 may also be referred to as a storage medium.

Second device 1804 may include, for example, a communication interface 1830 that provides for or otherwise supports the operative coupling of second device 1804 to a wireless communications network at least through an antenna 1808. By way of example but not limitation, communication interface 1830 may include a network interface device or card, a modem, a router, a switch, a transceiver, and the like. In other alternative implementations, communication interface 1830 may comprise a wired/LAN interface, wireless LAN interface (e.g., IEEE std. 802.11 wireless interface) and/or a wide area network (WAN) air interface. In a particular implementation, antenna 1808 in combination with communication interface 1830 may be used to implement transmission and reception of signals as illustrated in FIGS. 4 and 5.

In one particular implementation, transmission of an ACK message in response to a FTM measurement request message may be performed at communication interface 1830 without instruction or initiation from processing unit 1830. On the other hand, an FTM range report message may be formed at a programmable device such as processing unit 1820 (e.g., from execution of one or more machine-readable instructions stored in memory 1820).

Second device 1804 may include, for example, an input/output device 1832. Input/output device 1832 is representative of one or more devices or features that may be configurable to accept or otherwise introduce human or machine inputs, or one or more devices or features that may be configurable to deliver or otherwise provide for human or machine outputs. By way of example but not limitation, input/output device 1832 may include an operatively configured display, speaker, keyboard, mouse, track-ball, touch screen, data port, etc. Another particular implementation is directed to an observing wireless transceiver device comprising: means for receiving one or more messages from an assisting wireless transceiver device comprising one or more Neighbor Report Subelements fields, at least one of the Neighbor Report Subelements fields comprising a Wide bandwidth channel subelement specifying one or more parameters of one or more neighboring wireless transceiver devices; and means for exchanging messages with the neighboring wireless transceiver devices based, at least in part, on the one or more parameters. In one embodiment, the Wide Bandwidth Channel subelement further specifies High Throughput (HT) or Very High Throughput (VHT) parameters of the at least one of the one or more neighboring transceiver devices. In another embodiment, the observing wireless transceiver device further comprises means for obtaining one or more measurements indicative of a range to the at least one of the one or more neighboring wireless transceiver devices based, at least in part, on the exchanging messages. In another embodiment, the observing wireless transceiver device further comprises means for transmitting one or more fine timing measurement (FTM) Range Report messages to the assisting wireless transceiver device based, at least in part, on the obtained one or more measurements. In another embodiment, the Wide Bandwidth Channel subelement further specifies a center frequency of at least one primary channel and a frequency offset of a center frequency of a secondary segment from the center frequency of the at least one primary channel. In another embodiment, the one or more messages comprising the one or more Neighbor Report Subelements fields comprise one or more Neighbor Report Response messages transmitted in response to a Neighbor Report Request message. In another embodiment, the one or more messages comprising the one or more Neighbor Report Subelements fields comprise one or more fine timing measurement (FTM) Range Request messages.

Another particular implementation is directed to a non-transitory storage medium comprising machine-readable instructions stored thereon which are executable by one or more processors of an observing first wireless transceiver device to: obtain one or more messages received from an assisting wireless transceiver device comprising one or more Neighbor Report Subelements fields, at least one of the Neighbor Report Subelements fields comprising a Wide bandwidth channel subelement specifying one or more parameters of one or more neighboring wireless transceiver devices; and initiate an exchange of messages with the neighboring wireless transceiver devices based, at least in part, on the specified one or more parameters. In one embodiment, the Wide Bandwidth Channel subelement further specifies High Throughput (HT) or Very High Throughput (VHT) parameters of the at least one of the one or more neighboring transceiver devices. In another particular embodiment, the instructions are further executable to obtain one or more measurements indicative of a range to the at least one of the one or more neighboring wireless transceiver devices based, at least in part, on the exchanging messages. In another embodiment, the instructions are further executable to initiate transmission of one or more fine timing measurement (FTM) Range Report messages to the assisting wireless transceiver device based, at least in part, on the obtained one or more measurements. In another embodiment, the Wide Bandwidth Channel subelement further specifies a center frequency of at least one primary channel and a frequency offset of a center frequency of a secondary segment from the center frequency of the at least one primary channel. In another embodiment, the one or more messages comprising the one or more Neighbor Report Subelements fields comprise one or more Neighbor Report Response messages transmitted in response to a Neighbor Report Request message. In another embodiment, the one or more messages comprising the one or more Neighbor Report Subelements fields comprise one or more fine timing measurement (FTM) Range Request messages. In another embodiment, the one or more messages comprise the one or more Neighbor Report Subelements fields comprise one or more fine timing measurement (FTM) Range Request messages. In another embodiment, the one or more messages comprise the one or more Neighbor Report Subelements fields comprise one or more fine timing measurement (FTM) Range Request messages. In another embodiment, the one or more messages transmitted from the assisting wireless transceiver device comprise at least one Access Network Query Protocol (ANQP) query response message transmitted in response to an ANQP query request message.

Another particular implementation is directed to an assisting wireless transceiver device comprising: means for receiving a first message from an observing wireless transceiver device; means for transmitting one or more second messages to the observing wireless transceiver device in response to receipt of the first message, the one or more second messages comprising one or more Neighbor Report Subelements fields, at least one of the Neighbor Report Subelements fields comprising a Wide Bandwidth Channel subelement specifying parameters of one or more neighboring wireless transceiver devices. In one embodiment, the one or more parameters in the Wide Bandwidth Channel subelement specify high throughput (HT) or very high throughput (VHT) parameters of the at least one of the one or more neighboring transceiver devices. In another embodiment, the Wide Bandwidth Channel subelement further specifies a center frequency of at least one primary channel and a frequency offset of a center frequency of a secondary segment from the center frequency of the at least one primary channel. In another embodiment, the assisting wireless transceiver device further comprises means for transmitting one or more messages to an observing wireless transceiver device comprising one or more Neighbor Report Subelements fields, at least one of the one or more Neighbor Report Subelements fields comprising a Wide bandwidth channel subelement specifying one or more parameters of one or more neighboring wireless transceiver devices. In another embodiment, the assisting wireless transceiver device further comprises means for receiving one or more messages comprising one or more parameters indicating of ranges between the observing wireless transceiver device and at least one of the one or more neighboring wireless transceiver devices. In another embodiment, the one or more messages comprising the one or more Neighbor Report Subelements fields further comprise one or more Neighbor Report Response messages. In another embodiment, the one or more messages comprising the one or more Neighbor Report Subelements fields comprise one or more Access Network Query Protocol (ANQP) query response messages.

Another particular implementation is directed to a non-transitory storage medium comprising machine-readable instructions stored thereon which are executable by one or more processors of an assisting wireless transceiver device to: initiate transmission of one or more messages to an observing wireless transceiver device comprising one or more Neighbor Report Subelements fields, at least one of the Neighbor Report Subelements fields comprising a Wide bandwidth channel subelement specifying one or more parameters of one or more neighboring wireless transceiver devices. In one embodiment, the instructions are further executable to obtain one or more messages comprising one or more parameters indicating of ranges between the observing wireless transceiver device and at least one of the one or more neighboring wireless transceiver devices. In another embodiment, the Wide Bandwidth Channel subelement further specifies high throughput (HT) or very high throughput (VHT) parameters of the at least one of the one or more neighboring transceiver devices. In another embodiment, the Wide Bandwidth Channel subelement further specifies a center frequency of at least one primary channel and a frequency offset of a center frequency of a secondary channel from the center frequency of the at least one primary channel. In another embodiment, the one or more messages comprising the one or more Neighbor Report Subelements fields further comprise one or more Neighbor Report Response messages. In another embodiment, the one or more messages comprising the one or more Neighbor Report Subelements fields comprise one or more Access Network Query Protocol (ANQP) query response messages.

As used herein, the term "access point" is meant to include any wireless communication station and/or device used to facilitate communication in a wireless communications system, such as, for example, a wireless local area network, although the scope of claimed subject matter is not limited in this respect. In another aspect, an access point may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices and a network such as the Internet, for example.

As used herein, the term "mobile device" refers to a device that may from time to time have a position location that changes. The changes in position location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units de-signed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIG. 1, for example, a wireless communication network may comprise two or more devices from mobile devices 100*a*, 100*b*, 115*a* and 115*b*. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access ("CDMA") cellular communication protocol, for example, and the femtocell may provide the mobile device access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples. References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. At an observing wireless transceiver device, a method comprising:
   receiving one or more fine timing measurement (FTM) range request messages from an assisting access point device comprising one or more neighbor report subelements fields, at least one of the one or more neighbor report subelements fields comprising a wide bandwidth channel subelement of one or more neighboring wireless transceiver devices, the one or more FTM range request messages being initiated by the assisting access point device; and
   exchanging messages with at least one of the one or more neighboring wireless transceiver devices based, at least in part, on one or more parameters in the wide bandwidth channel subelement, the exchanging of messages utilized to determine round trip time or other parameters indicative of range between the observing wireless transceiver device and the one or more neighboring wireless transceiver devices.

2. The method of claim 1, wherein the wide bandwidth channel subelement further specifies high throughput (HT) or very high throughput (VHT) parameters of the at least one of the one or more neighboring wireless transceiver devices.

3. The method of claim 1, and further comprising:
   obtaining one or more measurements indicative of a range to the at least one of the one or more neighboring wireless transceiver devices based, at least in part, on the exchanging messages.

4. The method of claim 3, and further comprising transmitting one or more fine timing measurement (FTM) range report messages to the assisting access point device based, at least in part, on the obtained one or more measurements.

5. The method of claim 1, wherein the wide bandwidth channel subelement further specifies a center frequency of at least one primary channel and a frequency offset of a center frequency of a secondary segment from the center frequency of the at least one primary channel.

6. An observing wireless transceiver device comprising:
   a receiver to receive messages from a wireless communication network;
   a transmitter to transmit messages to the wireless communication network; and
   one or more processors configured to:
      obtain one or more fine timing measurement (FTM) range request messages received at the receiver from an assisting access point device comprising one or more neighbor report subelements fields, at least one of the one or more neighbor report subelements fields comprising a wide bandwidth channel subelement of one or more neighboring wireless transceiver devices, the one or more FTM range request messages being initiated by the assisting access point device; and
      initiate an exchange of messages through the transmitter with at least one of the one or more neighboring wireless transceiver devices based, at least in part, on one or more parameters in the wide bandwidth channel subelement, the exchange of messages utilized to determine round trip time or other parameters indicative of range between the observing wireless transceiver device and the one or more neighboring wireless transceiver devices.

7. The observing wireless transceiver device of claim 6, wherein the one or more parameters in the wide bandwidth channel subelement specify high throughput (HT) or very high throughput (VHT) parameters of the at least one of the one or more neighboring transceiver devices.

8. The observing wireless transceiver device of claim 6, wherein the wide bandwidth channel subelement further specifies a center frequency of at least one primary channel and a frequency offset of a center frequency of a secondary segment from the center frequency of the at least one primary channel.

9. The observing wireless transceiver device of claim 6, wherein the one or more processors are further configured to:
   obtain one or more measurements indicative of a range to the at least one of the one or more neighboring wireless transceiver devices based, at least in part, on the exchange of messages.

10. The observing wireless transceiver device of claim 9, wherein the one or more processors are further configured to initiate transmission of one or more fine timing measurement (FTM) range report messages to the assisting access point device based, at least in part, on the obtained one or more measurements.

11. A method, at an assisting access point device, comprising:
    transmitting one or more fine timing measurement (FTM) range request messages to an observing wireless transceiver device comprising one or more neighbor report subelements fields, at least one of the one or more neighbor report subelements fields comprising a wide bandwidth channel subelement specifying one or more parameters of one or more neighboring wireless transceiver devices, the one or more FTM range request messages being initiated by the assisting access point device, wherein the range request message being utilized to assist in determining round trip time or other parameters indicative of range between the observing wireless transceiver device and the one or more neighboring wireless transceiver devices.

12. The method of 11, further comprising receiving one or more messages comprising one or more parameters indicating of ranges between the observing wireless transceiver device and at least one of the one or more neighboring wireless transceiver devices.

13. The method of claim 11, wherein the wide bandwidth channel subelement further specifies high throughput (HT) or very high throughput (VHT) parameters of the at least one of the one or more neighboring wireless transceiver devices.

14. The method of claim 11, wherein the wide bandwidth channel subelement further specifies a center frequency of at least one primary channel and a frequency offset of a center frequency of a secondary channel from the center frequency of the at least one primary channel.

15. An assisting access point device comprising:
- a receiver to receive messages from a wireless communication network;
- a transmitter to transmit messages to the wireless communication network; and
- one or more processors configured to:
  - initiate transmission of one or more fine timing measurement (FTM) range request messages through the transmitter to an observing wireless transceiver device comprising one or more neighbor report subelements fields, at least one of the one or more neighbor report subelements fields comprising a wide bandwidth channel subelement specifying one or more parameters of one or more neighboring wireless transceiver devices, the one or more FTM range request messages being initiated by the assisting access point device, wherein the transmission of one or more messages utilized to determine round trip time or other parameters indicative of range between the observing wireless transceiver device and the one or more neighboring wireless transceiver devices.

16. The assisting access point device of claim 15, wherein the wide bandwidth channel subelement further specifies high throughput (HT) or very high throughput (VHT) parameters of the at least one of the one or more neighboring wireless transceiver devices.

17. The assisting access point device of claim 15, wherein the wide bandwidth channel subelement further specifies a center frequency of at least one primary channel and a frequency offset of a center frequency of a secondary segment from the center frequency of the at least one primary channel.

\* \* \* \* \*